United States Patent
Pellinghelli et al.

(10) Patent No.: US 10,309,541 B2
(45) Date of Patent: Jun. 4, 2019

(54) GUIDE ELEMENT FOR A VALVE ACTUATOR AND ACTUATOR PROVIDED WITH SAID GUIDE ELEMENT

(71) Applicant: FLOWSERVE S.R.L., Cormano (mi) (IT)

(72) Inventors: Ferruccio Pellinghelli, Cormano (IT); Ivo Contardi, Cormano (IT)

(73) Assignee: FLOWSERVE S.R.L., Cormano (MI) (IT)

( * ) Notice: Subject to any disclaimer, the term of this patent is extended or adjusted under 35 U.S.C. 154(b) by 33 days.

(21) Appl. No.: 15/312,786

(22) PCT Filed: May 21, 2015

(86) PCT No.: PCT/IB2015/053746
§ 371 (c)(1),
(2) Date: Nov. 21, 2016

(87) PCT Pub. No.: WO2015/177752
PCT Pub. Date: Nov. 26, 2015

(65) Prior Publication Data
US 2017/0102080 A1    Apr. 13, 2017

(30) Foreign Application Priority Data
May 22, 2014 (IT) ............................. PC2014A0011

(51) Int. Cl.
*F16K 31/528* (2006.01)
*F16K 5/04* (2006.01)
(Continued)

(52) U.S. Cl.
CPC ............ *F16K 5/0442* (2013.01); *F16C 17/10* (2013.01); *F16C 31/02* (2013.01); *F16K 27/065* (2013.01);
(Continued)

(58) Field of Classification Search
CPC ...... F16C 11/06; F16C 2361/91; F16C 23/04; F16C 25/04; F16C 29/02; F16C 29/0626;
(Continued)

(56) References Cited

U.S. PATENT DOCUMENTS 1,226,685 A * 5/1917 Modler ................. F16C 23/086
384/551
3,672,262 A    6/1972 Karr
(Continued)

FOREIGN PATENT DOCUMENTS

EP       2 242 946 B1    2/2013

OTHER PUBLICATIONS

International Search Report, dated Sep. 24, 2015, from corresponding PCT Application.

*Primary Examiner* — Matthew W Jellett
(74) *Attorney, Agent, or Firm* — Young & Thompson

(57) ABSTRACT

Disclosed is a guide element, for supporting and guiding a pin (P) of a glyph in a slot along a sliding direction. The guide element includes a central body (10) provided with a seat adapted to house a portion of the pin (P) and at least one lateral portion (10, 30) which has a sliding surface (21, 31) adapted to slide in contact with a respective lateral wall of the slot. The central body (10) and the at least one lateral portion (20, 30) are configured to rotate relative to each other about an axis (X) parallel to the sliding direction.

20 Claims, 4 Drawing Sheets

(51) Int. Cl.
*F16K 31/163* (2006.01)
*F16C 17/10* (2006.01)
*F16C 31/02* (2006.01)
*F16K 27/06* (2006.01)

(52) U.S. Cl.
CPC ........ *F16K 31/1635* (2013.01); *F16K 31/528* (2013.01); *F16C 2361/91* (2013.01)

(58) Field of Classification Search
CPC ........ F16C 29/007; F16C 31/00; F16C 31/02; F16C 31/04; F16K 31/528; F16K 31/5282; F16K 31/5284; F16K 31/5286
USPC .............................. 251/259; 384/38; 16/93 R
See application file for complete search history.

(56) References Cited

U.S. PATENT DOCUMENTS

| | | | | |
|---|---|---|---|---|
| 4,337,691 A | * | 7/1982 | Tomaru | F15B 15/066 251/58 |
| 4,637,738 A | * | 1/1987 | Barkley | B23Q 1/36 384/38 |
| 6,055,778 A | | 5/2000 | Ide et al. | |
| 6,295,762 B1 | * | 10/2001 | Nemoto | E05F 11/445 49/374 |
| 6,640,688 B1 | * | 11/2003 | Harper | F15B 15/066 92/129 |
| 6,969,199 B2 | * | 11/2005 | Moshammer | F16C 29/001 384/38 |
| 7,217,034 B2 | * | 5/2007 | Moshammer | F16C 29/02 384/38 |
| 8,157,451 B2 | * | 4/2012 | Solfrank | F16C 19/46 384/457 |
| 8,863,596 B2 | * | 10/2014 | Holtgraver | F16K 31/1635 251/229 |
| 2002/0104432 A1 | * | 8/2002 | Shimo | F04B 27/0886 92/71 |
| 2008/0181719 A1 | * | 7/2008 | Gleason | F16C 11/0614 403/76 |
| 2010/0288956 A1 | * | 11/2010 | Dordoni | F16K 31/1635 251/213 |

* cited by examiner

PRIOR ART

GUIDE ELEMENT FOR A VALVE ACTUATOR AND ACTUATOR PROVIDED WITH SAID GUIDE ELEMENT

The invention relates to a guide element of an actuator for controlling valves.

More in detail, the invention relates to a guide element adapted to support and guide a pin along a track of a glyph mechanism which is part of the actuator. The invention also relates to an actuator provided with such a guide element.

The sector of interest is the sector for controlling on-off and regulating valves of medium and large systems, such as gas pipelines, oil pipelines or the like.

As it is known, in systems of this type, on-off and control valves are provided with a remote control for opening or closing them, for example in emergency conditions.

Typically, control of these valves is entrusted to hydraulic actuators, and optionally to mechanical systems provided with springs, which by means of a lever mechanism rotate the valve plug from a completely open position to a completely closed position, and vice versa, through intermediate positions.

The guide element of the invention can be efficiently, although not exclusively, applied to valve actuators.

More in detail, the invention is particularly suitable for use in valve actuators with an operating angle of the plug of 90°, also known as "quarter of a turn".

An example of a prior art actuator, applicable to these valves, is described in U.S. Pat. No. 3,672,262.

These valves comprise a stem, integral with the plug, which extends outside the casing of the valve to be connected to an actuator.

The actuator generally comprises a sleeve, connected to the stem, and a pair of glyph elements integral in rotation with the sleeve, with respective slots arranged overlapped and vertically aligned with each other.

In each slot there is housed a guide element in the form of a block that can slide in contact with the lateral walls of the slot. A pin is supported at the ends by the two guide elements.

The pin is connected directly or indirectly to the rod of at least one hydraulic or pneumatic cylinder, or of a spring container, which exerts a thrust on the pin causing sliding of the guide elements along the slots and consequently rotation of the glyph elements integral with the sleeve and the stem of the valve.

The prior art guide elements generally comprise a monolithic body with two flat parallel faces positioned at a distance coinciding with the distance between the lateral walls of the slot.

The pin is housed in a cylindrical seat that allows rotation between it and the body of the guide element.

Prior art guide elements thus configured have some problems.

Among these, the most relevant concerns their duration and in particular the way in which they are subject to wear due to rubbing against the lateral walls of the slots.

Even more in detail, the problem of prior art guide elements concerns the uneven wear that occurs, after a certain period of operation, on the surface of a same lateral face.

This problem is known and is caused by the elastic bending to which the pin is subjected following thrust generated by the actuator.

This bending, albeit slight, causes a rotation of the body of the guide element whose sliding faces are no longer perfectly parallel to the lateral walls of the glyph.

For a better understanding of the phenomenon, FIG. 1 schematically represents a portion of a prior art actuator in which the pin P is bent following thrust of the actuator rod R.

As can be seen, the thrust of the rod R causes the pin to bend from the ends, where it is constrained to the guide elements G, toward the centre, where the force F of the actuator is applied.

This bending generates a deformation of the axis of the pin P that involves the whole of its length up to the ends. It is this deformation of the ends that causes a rotation of the guide element inside the slot A of the glyph M.

Following rotation of the body of the guide element G, the sliding faces S are also rotated to a position in which they are no longer parallel with the lateral walls L of the slot of the glyph.

More in detail, the sliding faces S remain in contact with lateral walls only in a limited area ZC, as can be seen in FIG. 1.

It must be noted that in this figure, the deformations and the movements are purposely emphasized to make the phenomenon easier to see and comprehend; in actual fact, these deformations are minimum and in the order of a few tenths of millimeter.

Despite this, the high pressures that are created between the lateral walls of the glyph and the sliding faces of the guide element cause premature aging of these latter in the area of greatest contact ZC until the guide element is no longer usable.

In fact, the guide element is generally made of or coated with a softer material (typically brass, bronze or alloys thereof, or synthetic materials such as PTFE or derivatives thereof) with respect to the material of the glyph (typically steel with surface treatments).

This allows periodic replacement of the guide element alone, when it becomes excessively worn, while preserving the glyph element, which would be much more costly to replace.

Replacement of the guide element alone, besides the cost for purchasing the new component, also involves further costs for disassembling or removing the actuator, as well as undesirable stops in the production line in order to carry out this operation.

It is clear that replacing it more frequently than necessary, due to abnormal wear of the sliding surface, causes an undoubtedly undesirable increase in costs.

Moreover, during the process of progressive wear of the guide element, it gradually loses the sliding properties of the materials indicated above.

This has a negative influence on the torque transmitted by the glyph to the valve plug due to the increased dispersions of the force transmitted by the actuators caused by increased friction between the guide element and the lateral walls of the glyph.

EP 2242946 B1 describes a valve actuator in which the guide element is hinged on a slider connectable to valve actuator means. The slider is guided along a rectilinear direction by linear guides integral with the actuator case.

A prior art actuator of this kind has relatively large overall dimensions, due to the size of the slider in which the seats for housing the linear guides are positioned. Moreover, these seats and these linear guides form further elements subject to malfunction and wear, which thus complicate maintenance operations on the device.

Further, the structure of this actuator is more complex and consequently more costly with respect to that of other prior art actuators, such as those described above.

In this context, the object of the present invention is to propose a guide element of a pin in a glyph of a valve actuator, which overcomes the aforesaid problems of the prior art.

Therefore, an object of the present invention is to produce a guide element that allows a reduction in the wear of the sliding surface and, consequently, an increase in the duration thereof.

Another object of the present invention is to propose a guide element that is structurally simple, inexpensive and can be made with materials equivalent to those used for prior art guide elements.

Another object of the present invention is to propose a guide element that can be applied to existing actuators, without requiring to modify or adapt them.

A further object of the present invention is to provide a guide element that allows a reduction in the quantity of material of the worn parts to be replaced, allowing a further decrease in maintenance costs.

Besides the aforesaid objects, it is also an object of the present invention to propose a valve actuator that is more efficient, more reliable and requires less frequent maintenance.

These objects are achieved by a guide element with a body that is not monolithic like those of the prior art, but which comprises at least two parts. A first part can be connected to the pin of the glyph, while the other carries the sliding surface that is brought into sliding contact with a wall of the slot. According to the invention, the two parts are movable with respect to each other so that the first part does not transmit to the second part the rotations imposed by bending of the pin during operation of the glyph mechanism. The second part that carries the sliding surface can therefore remain completely in contact with the lateral wall of the slot, i.e. substantially parallel thereto.

In a preferred embodiment of the invention, the guide element comprises at least three parts, two of which each carry a sliding surface, one opposite the other. The guide element thus described is used in cases in which the pin of the glyph is subject to considerable thrusts in both directions of movement of the mechanism.

To allow the guide element to support the pin without play or vibrations, the parts of the guide element are joined to each other at curved bearing surfaces that allow a relative rotation between the parts while they remain in contact with each other.

The invention thus relates to a guide element of a pin in a valve actuator, adapted to support and guide a pin in a slot of a glyph along a sliding direction, which comprises a central body, provided with a seat adapted to house a portion of said pin and at least one lateral portion, which has a sliding surface adapted to slide in contact with a respective lateral wall of the slot.

According to the invention, the central body and the at least one lateral portion are configured to rotate relative to each other about an axis parallel to the sliding direction.

The central body is therefore, released from the lateral portion in the movement of rotation about this axis.

When the pin of the glyph bends due to the force applied by the valve actuators, the central body can rotate integral therewith while the lateral portion, which rotates with respect to the central body, can remain in an optimal operating position in which the sliding surface is parallel to the lateral wall of the slot.

In one aspect of the invention, the central body can have at least one outer bearing surface, at least partly cylindrical. The axis of the cylindrical surface is parallel to the sliding direction. The lateral portion, on an inner face, has a corresponding inner bearing surface, partly cylindrical, adapted to rotate in contact with the outer bearing surface.

The two surfaces, having substantially the same radius and sharing the same axis, remain in contact substantially for the whole of the overlapped area, giving stability to the lateral portion.

The outer bearing surface of the central body can extend for a portion or for the whole length of the central body.

Instead, the angular amplitude of the inner bearing surface can vary as a function of the dimensions of the guide element, but is typically between 60° and 120°.

To prevent the lateral portion from translating with respect to the central body along a direction parallel to the sliding direction, the guide element is provided with specific constraint means.

These constraint means can comprise, for example, two flaps, one front and one rear. In a variant, these flaps protrude beyond the inner bearing surface, so as to at least partly overlap, respectively on a front face and a rear face of the central body.

In an alternative variant, said constraint means can comprise at least one element protruding from the inner bearing surface adapted to be inserted in a slot formed on the outer bearing surface of the central body.

In another aspect of the invention, the guide element comprises two lateral portion provided with respective sliding surfaces. The two portions, and the respective sliding surfaces, are arranged specularly with respect to a plane of symmetry of the guide element.

In this way, the guide element can operate efficiently when the direction of the force that acts on the pin thrusts one or the other sliding surface against the respective wall of the adjacent slot.

Rotation of the second lateral portion takes place on a second outer bearing surface, at least partly cylindrical, and whose axis is parallel to the sliding direction.

According to another aspect of the invention, the axes of the two outer bearing surfaces of the central body are coincident.

This allows the central body to rotate simultaneously with respect to the two lateral portions without transmitting to either of these portions forces, such as rotational moments about an axis parallel to the sliding direction or forces directed along the axis of the pin.

The aforesaid objects are also achieved by an actuator for controlling a valve which comprises:
- a glyph element connectable to a valve plug;
- a pin sliding along a slot of said glyph element;
- actuating means acting on the pin for rotating the glyph element; and
- a guide element connected to said pin and housed in the slot with the possibility of sliding in contact with at least one lateral wall of said slot.

The guide element is produced according to one or more of the aforesaid characteristics of the invention.

Further characteristics and advantages of the present invention will become more apparent from the description of an example of a preferred, but not exclusive, embodiment of a guide element of a pin in a glyph, as illustrated in the accompanying drawings, wherein:

FIG. 1 schematically represents a portion of a prior art actuator;

Figure 1:
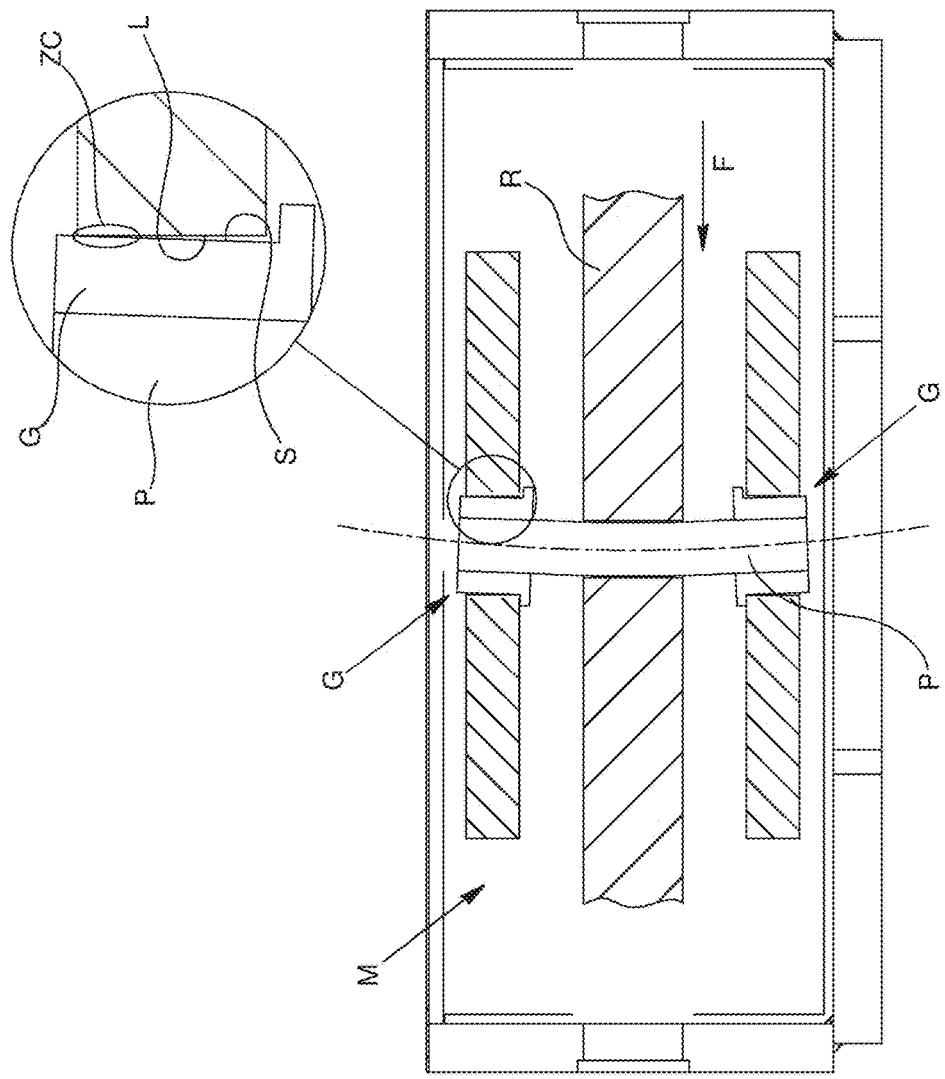
Figure 2:
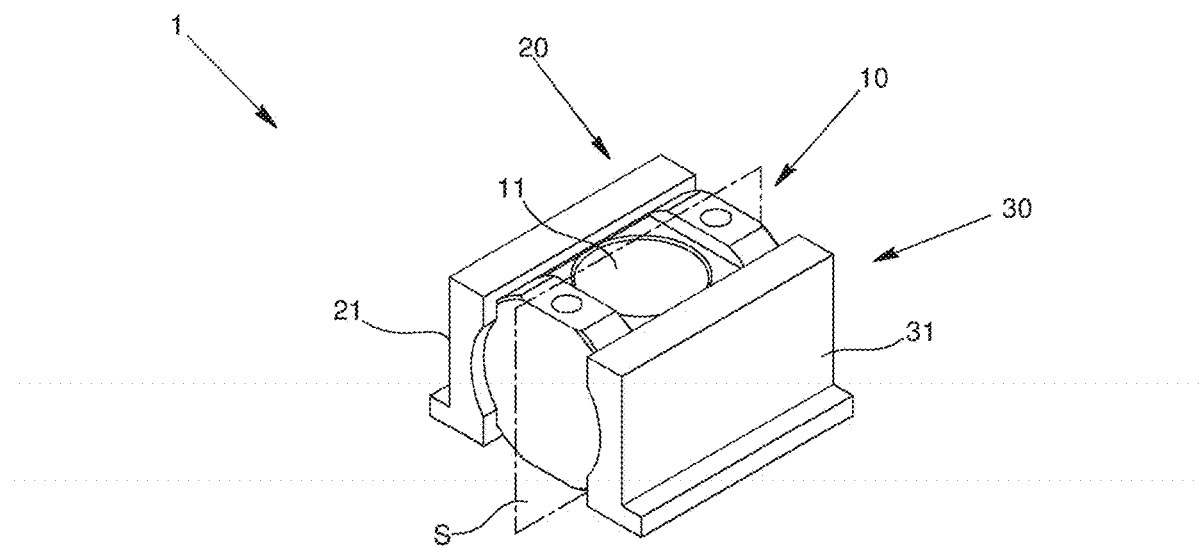
FIG. 2 is a perspective view of the guide element according to the invention.
Figure 3:
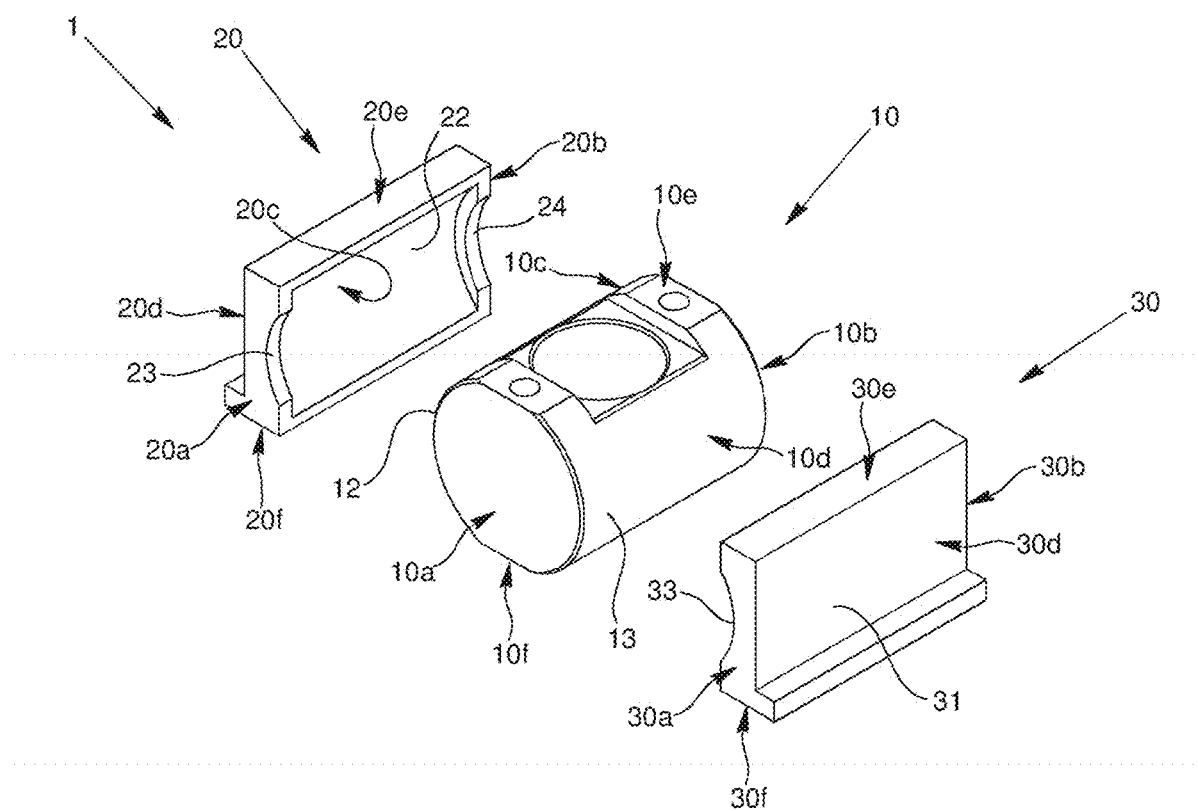
FIG. 3 is an exploded view of the guide element according to the invention.
Figure 4:
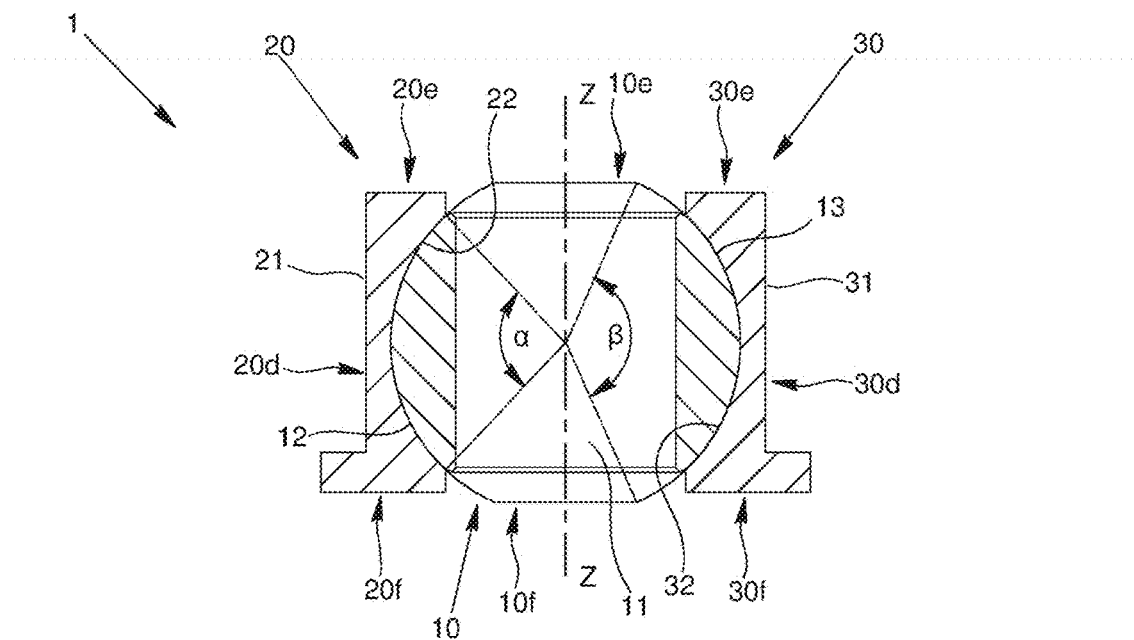
FIG. 4 is a cross sectional view of the guide element of FIG. 2.
Figure 5:
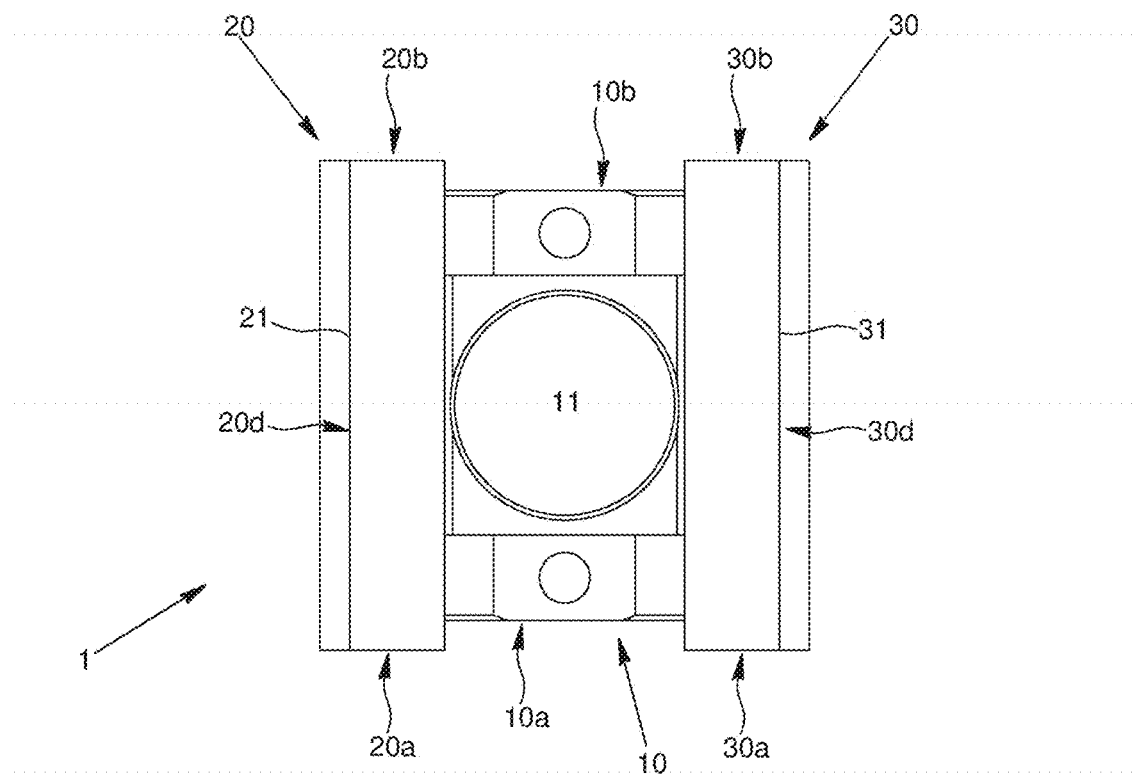
FIG. 5 is a top view of the guide element of FIG. 2.

With reference to the accompanying figures, the guide element, indicated as a whole with 1, comprises a central body 10, a first lateral portion 20 and a second lateral portion 30.

The lateral portions 20, 30 are separated from the central body 10 and can be placed next to it to form the assembly of the guide element 1.

When the central body 10 and the lateral portions 20, 30 are joined to one another, the guide element 1 has a substantially parallelepiped shape.

In a variant, not shown, the lateral portions 20, 30 can be connected to the central body so that they can move or rotate with respect thereto.

According to the invention, the lateral portions can be more than two in number.

For example, on each side of the central body 10 there can be positioned a plurality of side-by-side lateral portions, which partly or fully cover the length of the central body 10.

In practice, each lateral portion 20, 30 can be a single element or divided into a plurality of separate elements.

The central body 10 is defined by a front face 10a, a rear face 10b, lateral walls 10c, 10d, an upper face 10e and a lower face 10f.

In the central body 10 there is formed a seat 11, typically cylindrical, adapted to house a pin P (FIGS. 6, 7) of a glyph mechanism, better described below.

This seat 11 extends vertically along an axis Z and preferably passes through the entire height of the body 10.

At the lateral walls 10c, 10d thereof, the central body 10 respectively has a first outer bearing surface 12 and a second outer bearing surface 13. These outer bearing surfaces 12, 13 are at least partly cylindrical.

The term at least partly cylindrical surface is intended as a surface defined by the projection along an axis of a circular arc, where this circular arc can have an amplitude equal to or less than 360°.

According to a preferred variant of the invention, the two outer bearing surfaces 12, 13 share the same axis X.

This axis X is arranged parallel to the sliding direction of the guide element in the slot of the glyph mechanism.

Preferably, the outer bearing surfaces 12, 13 are specular with respect to a plane of symmetry S of the central body 10, passing through the aforesaid axis X.

These outer bearing surfaces 12, 13 can extend along the axis X only for a portion of the central body 10 or, as in the preferred variant, for the whole of its length.

The lateral portions 20, 30 respectively comprise a front face 20a, 30a, a rear face 20b, 30b, lateral faces 20c, 20d, 30c, 30d, an upper face 20e, 30e and a lower face 20f, 30f.

On the outer lateral faces 20d, 30d there are formed respective flat sliding surfaces 21, 31, adapted to slide in contact with respective lateral walls of the slot of the glyph mechanism.

For this purpose, the lateral portions 20, 30 are preferably made of a metal with low friction coefficient, such as brass, bronze, or alloys thereof.

Alternatively, the lateral portions can be made of different metals and provided with a coating or with an insert made of synthetic material (such as PTFE or its derivatives) positioned at the sliding surface 21, 31.

The central body 10 can be made of steel, or can also be brass, bronze or the like, just as the lateral portions 20, 30.

The lateral portions 20, 30 are joined to the central body 10 at the inner lateral faces 20c, 30c.

On the inner face 20c of the first lateral portion 20 there is formed a first inner bearing surface 22; on the inner face 30c of the second lateral portion 30 there is formed a second inner bearing surface 32.

The inner bearing surfaces 22, 32 are complementary to the respective outer bearing surfaces 12, 13, i.e. they have the same radius of curvature.

When the inner bearing surfaces 22, 32 are in contact with the outer bearing surfaces 12, 13, they all share the same axis X.

As already mentioned, this characteristic allows the central body 10 to rotate freely with respect to the lateral portions 20, 30 about the axis X.

During rotation, the inner 22, 32 and outer 12, 13 bearing surfaces slide in contact with each other.

Preferably, the angular extension α of the inner bearing surfaces 22, 32 of the lateral portions 20, 30 can vary as a function of the dimensions of the guide element, but is typically between 60° and 120°.

The angular extension of the outer bearing surfaces 12, 13 is greater with respect to that of the inner bearing surfaces 22, 23. In this way, when the lateral portions 20 rotate about the axis X with respect to the central body 10, the inner bearing surfaces can remain completely overlapped on the respective outer bearing surfaces 12, 13.

For example, the angular extension β of the outer bearing surfaces 12, 13 is between 100° and 150°.

According to the invention, the guide element is provided with constraint means adapted to block translation of the lateral portions 20, 30 along the axis X with respect to the central body 10.

In a preferred embodiment, said constraint means comprise front flaps 23, 33 and rear flaps 24, 34, which protrude beyond the inner bearing surfaces 22, 32.

These flaps 23, 33, 24, 34 are structured so as to at least partly overlap on the front face 10a and on the rear face 10b of the central body 10.

In a variant of the invention (not shown in the figure), these constraint means can comprise at least one element projecting from the inner bearing surfaces 20, 30 adapted to slide in a vertical slot formed on the outer bearing surfaces 12, 13 of the central body 10.

Figure 6:
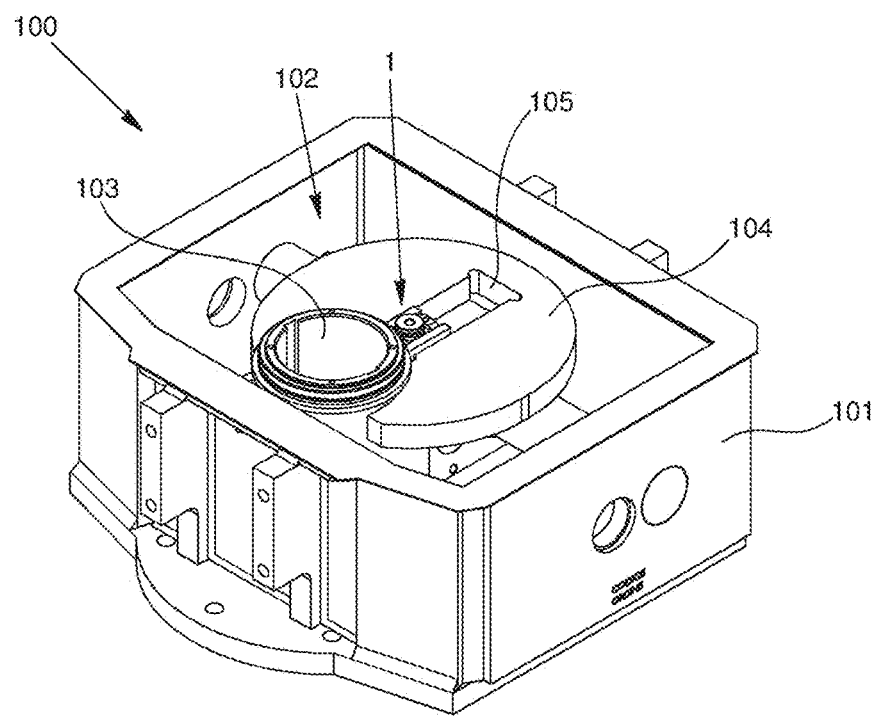
FIG. 6 is a perspective view of an actuator provided with the guide element according to the invention.
Figure 7:
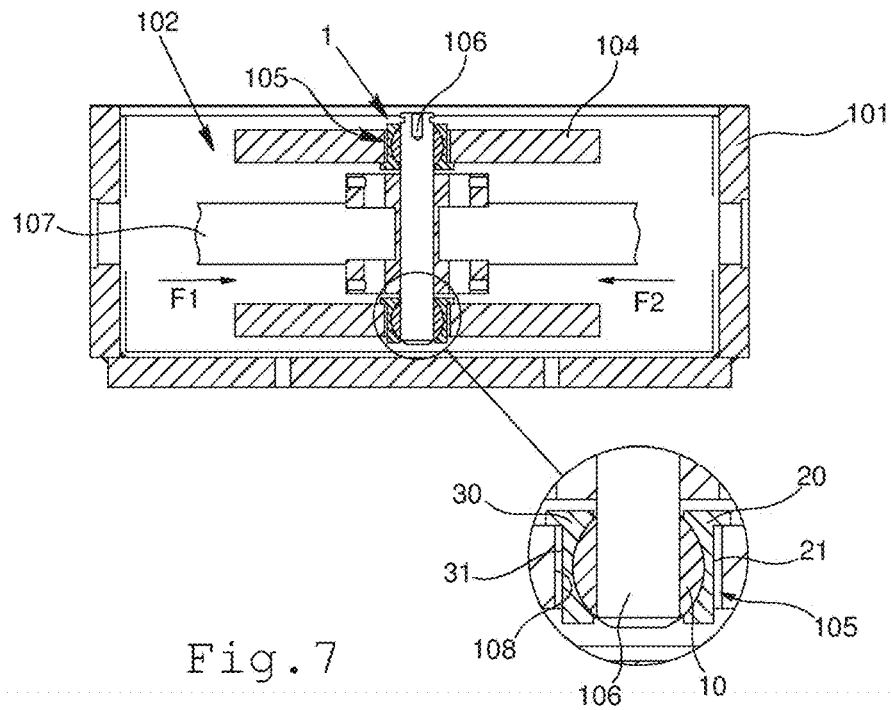
FIG. 7 is a sectional view according to the line A-A of the actuator of FIG. 6.

Operation of the guide element 1 will now be described with reference to FIGS. 6 and 7, which show a part of an actuator 100 for controlling butterfly valves, ball valves or the like.

The actuator 100 comprises a case 101 in which there is housed a glyph mechanism, indicated as a whole with 102.

The glyph mechanism 102 comprises a sleeve 103 connectable directly or indirectly to a valve plug (not shown in the figure).

The sleeve 103 is integral with a pair of parallel plates 104 in each of which there is formed a slot 105. The two slots 105 of the two plates are overlapped and aligned with each other.

A pin 106 is inserted between the two plates 104 with its ends at the slots 105.

Each end of the pin is supported in the slot 105 by a guide element 1 according to the invention.

More in detail, the ends of the pin 106 is inserted in the seat 11 of the central body 10 of the guide element. The lateral portions 20, 30 are substantially in contact with the lateral walls 108 of the slot 105.

On the pin 106 there acts a rod 107 connected to hydraulic, mechanical, or mixed, actuator means, not shown in the figure.

The actuators alternatively generate forces F1 or F2 respectively for closing and opening the valve.

As already mentioned, these forces tend to bend the pin 106 which takes an arched shape.

Following bending, the central body 10 is rotated by the end of the pin 106.

Therefore, the central body 10 can rotate with respect to the lateral portions 20, 30, which maintain their position.

The guide element can thus slide along the slot while the sliding surfaces 21, 31 of the lateral portions are perfectly parallel and completely in contact with the respective lateral walls of the slot 105.

As will be apparent, the guide element 1 of the present invention fulfils the intended objects.

Thanks to the relative rotation between the central body and the lateral portions, these are never influenced by bending of the pin of the glyph, even in high deformation conditions.

This allows the lateral portions to slide in contact with the lateral walls of the glyph at all times, obtaining uniform wear of both the surfaces.

In this way, it is possible to substantially reduce costs related to replacement of the guide elements, which is less frequent, and costs related to inefficiencies that require operations to be performed on a system.

The guide element of the invention also has a simple structure, which contributes to limiting manufacturing and implementation costs.

The invention has been described for illustrative and non-limiting purposes according to some preferred embodiments thereof. Those skilled in the art may find numerous other embodiments and variants, all falling within the scope of protection of the claims below.

The invention claimed is:

1. Guide element of a pin (P) in a valve actuator, adapted to support and guide said pin (P) in a slot of a glyph along a sliding direction, which comprises:
   a central body (10) provided with a seat adapted to house a portion of said pin (P);
   at least one lateral portion (10, 30) which has a sliding surface (21, 31) adapted to slide in contact with a respective lateral wall of the slot;
   wherein said central body (10) and said at least one lateral portion (20, 30) are configured to rotate relative to each other about an axis (X) parallel to the sliding direction, and
   wherein the guide element further comprises constraint means adapted to constrain the translation of the at least one lateral portion (20, 30) with respect to the central body (10) along a direction (X) parallel to the sliding direction.

2. The guide element according to claim 1, wherein the central body has at least one outer bearing surface (12, 13), at least partly cylindrical, whose axis (X) is parallel to the sliding direction, and the at least one lateral portion (20, 30), on an inner face (20c, 30c), has a corresponding inner bearing surface (22, 32) at least partly cylindrical, adapted to rotate in contact with the outer bearing surface (12, 13).

3. The guide element according to claim 2, wherein the outer bearing surface (12, 13) extends by the entire length of the central body (10).

4. The guide element according to claim 2, wherein the inner bearing surface (22, 32) of the lateral portion (20, 30) has an angular extension between 60° and 120°.

5. The guide element according to claim 1, wherein said constraint means comprise a front flap (23, 33) and a rear flap (24, 34), protruding from the inner bearing surface (22, 32), adapted to at least partly respectively overlap on a front face (10a) and a rear face (10b) of the central body (10).

6. The guide element according to claim 1, wherein said constraint means comprise at least one element projecting from the inner bearing surface (22, 32) adapted to be inserted in a slot formed on the outer bearing surface (12, 13) of the central body (10).

7. The guide element according to claim 1, further comprising two lateral portions (20, 30) provided with respective sliding surfaces (21, 31) arranged specular with respect to a plane of symmetry (S) of the guide element.

8. The guide element according to claim 7, wherein the central body (10) has two outer bearing surfaces (12, 13) at least partly cylindrical, the axes of said outer bearing surfaces (12, 13) being coincident.

9. Actuator for controlling a valve which comprises:
   a glyph element (102) connectable to a valve plug;
   a pin (106) sliding along a slot (105) of said glyph element;
   actuating means acting on the pin (106) for rotating the glyph element (102); and
   a guide element (1), according to claim 1;
   wherein said guide element (1) is connected to said pin (106) and is housed in the slot (105) slidably in contact with at least one lateral wall (108) of said slot.

10. The guide element according to claim 3, wherein the inner bearing surface (22, 32) of the lateral portion (20, 30) has an angular extension between 60° and 120°.

11. The guide element according to claim 2, further comprising two lateral portions (20, 30) provided with respective sliding surfaces (21, 31) arranged specular with respect to a plane of symmetry (S) of the guide element.

12. The guide element according to claim 3, further comprising two lateral portions (20, 30) provided with respective sliding surfaces (21, 31) arranged specular with respect to a plane of symmetry (S) of the guide element.

13. The guide element according to claim 4, further comprising two lateral portions (20, 30) provided with respective sliding surfaces (21, 31) arranged specular with respect to a plane of symmetry (S) of the guide element.

14. The guide element according to claim 5, further comprising two lateral portions (20, 30) provided with respective sliding surfaces (21, 31) arranged specular with respect to a plane of symmetry (S) of the guide element.

15. The guide element according to claim 6, further comprising two lateral portions (20, 30) provided with respective sliding surfaces (21, 31) arranged specular with respect to a plane of symmetry (S) of the guide element.

16. The guide element according to claim 11, wherein the central body (10) has two outer bearing surfaces (12, 13) at least partly cylindrical, the axes of said outer bearing surfaces (12, 13) being coincident.

17. Actuator for controlling a valve which comprises:
   a guide element (1), according to claim 2,
   a glyph element (102) connectable to a valve plug;
   a pin (106) sliding along a slot (105) of said glyph element;
   actuating means acting on the pin (106) for rotating the glyph element (102); and
   wherein said guide element (1) is connected to said pin (106) and is housed in the slot (105) slidably in contact with at least one lateral wall (108) of said slot.

18. Actuator for controlling a valve which comprises:
a guide element (1), according to claim 3,
a glyph element (102) connectable to a valve plug;
a pin (106) sliding along a slot (105) of said glyph element;
actuating means acting on the pin (106) for rotating the glyph element (102); and
wherein said guide element (1) is connected to said pin (106) and is housed in the slot (105) slidably in contact with at least one lateral wall (108) of said slot.

19. Actuator for controlling a valve which comprises:
a guide element (1), according to claim 5,
a glyph element (102) connectable to a valve plug;
a pin (106) sliding along a slot (105) of said glyph element;
actuating means acting on the pin (106) for rotating the glyph element (102); and
wherein said guide element (1) is connected to said pin (106) and is housed in the slot (105) slidably in contact with at least one lateral wall (108) of said slot.

20. Actuator for controlling a valve which comprises:
a guide element (1), according to claim 7,
a glyph element (102) connectable to a valve plug;
a pin (106) sliding along a slot (105) of said glyph element;
actuating means acting on the pin (106) for rotating the glyph element (102); and
wherein said guide element (1) is connected to said pin (106) and is housed in the slot (105) slidably in contact with at least one lateral wall (108) of said slot.

* * * * *